(12) United States Patent
Radjassamy

(10) Patent No.: US 6,931,562 B1
(45) Date of Patent: Aug. 16, 2005

(54) SYSTEM AND METHOD FOR TRANSFERRING DATA FROM A HIGHER FREQUENCY CLOCK DOMAIN TO A LOWER FREQUENCY CLOCK DOMAIN

(75) Inventor: Rajakrishnan Radjassamy, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 754 days.

(21) Appl. No.: 09/938,206

(22) Filed: Aug. 23, 2001

(51) Int. Cl.[7] .............................................. G06F 1/06
(52) U.S. Cl. .................... 713/501; 713/500; 713/503; 375/354; 375/355
(58) Field of Search ................... 713/500, 501, 713/503, 600; 710/52, 58; 375/354, 355

(56) References Cited

U.S. PATENT DOCUMENTS

| | | | | |
|---|---|---|---|---|
| 5,369,672 A | * | 11/1994 | Matsumoto | 375/354 |
| 5,548,620 A | * | 8/1996 | Rogers | 375/354 |
| 5,600,824 A | | 2/1997 | Williams et al. | 395/551 |
| 5,708,801 A | | 1/1998 | Williams et al. | 395/551 |
| 5,905,766 A | * | 5/1999 | Nguyen | 375/354 |
| 5,930,311 A | * | 7/1999 | Lovelace et al. | 375/354 |
| 6,163,545 A | * | 12/2000 | Flood et al. | 370/465 |
| 6,345,328 B1 | * | 2/2002 | Rozario et al. | 710/52 |

* cited by examiner

*Primary Examiner*—Lynne H. Browne
*Assistant Examiner*—Paul Yanchus, III

(57) ABSTRACT

A system and method for transferring data from circuitry disposed in a higher frequency clock domain actuated by a first clock signal to circuitry disposed in a lower frequency clock domain actuated by a second clock signal, wherein the first and second clock signals are provided in a predetermined frequency ratio. A first latch gated by a first modified clock signal that is derived from the first clock signal and plurality of intermediary signals relating thereto is operable to generate a first latched data output, which is provided to a second latch disposed in the lower frequency clock domain. The second latch gated by a second modified clock signal that is synthesized using the second clock signal and at least one intermediary clock signal derived therefrom is operable to generate a second latched output. A register is operable to synchronize the second latched data output into a synchronized data output for subsequent use by the circuitry disposed in the lower clock frequency domain.

36 Claims, 5 Drawing Sheets

SYSTEM AND METHOD FOR TRANSFERRING DATA FROM A HIGHER FREQUENCY CLOCK DOMAIN TO A LOWER FREQUENCY CLOCK DOMAIN

CROSS-REFERENCE TO RELATED APPLICATION(S)

This application discloses subject matter related to the subject matter disclosed in the following commonly owned co-pending patent application(s): (i) "System And Method For Synchronizing Data Transfer Across A Clock Domain Boundary," filed Jun. 22, 2001, application Ser. No. 09/887,793, in the name(s) of: Richard W. Adkisson; (ii) "SYNC Pulse Compensation And Generation In A Clock Synchronizer Controller," filed Jun. 22, 2001, application Ser. No. 09/887,797, in the name(s) of: Richard W. Adkisson; and (iii) "System And Method For Transferring Data From A Lower Frequency Clock Domain To A Higher Frequency Clock Domain," filed even date herewith, application Ser. No. 09/938,210, in the name(s) of: Rajakrishnan Radjassamy.

BACKGROUND OF THE INVENTION

1. Technical Field of the Invention

The present invention generally relates to data transfer synchronization techniques. More particularly, and not by way of any limitation, the present invention is directed to a skew-tolerant system and method for transferring data from circuitry disposed in a higher frequency clock domain to circuitry disposed in a lower frequency clock domain.

2. Description of Related Art

Computer systems often need to communicate with different interfaces, each running at an optimized speed for increased performance. Typically, multiple clock signals having different frequencies are utilized for providing appropriate timing to the interfaces. Further, the frequencies of such clock signals are generally related to one another in a predetermined manner. For example, a core or system clock running at a particular frequency ($F_C$) may be utilized as a master clock in a typical computer system for providing a time base with respect to a specific portion of its digital circuitry. Other portions of the computer system's digital circuitry (such as a bus segment and the circuitry disposed thereon) may be clocked using timing signals derived from the master clock wherein the derived frequencies (FD) follow the relationship: $F_C/F_D \geq 1$.

Because of the use of different—although related—frequencies for operating the constituent digital circuit portions, synchronizer circuitry is often used in computer systems to synchronize data transfer operations across a clock domain boundary so as to avoid timing-related data errors. Such synchronizer circuitry is typically required to possess low latency, so that the data is transferred as quickly as possible without significant delay. In addition, since the conventional arrangements to produce clocks of different yet related frequencies (e.g., phase-locked loops (PLLs) and the like) can have a large amount of input/output (I/O) jitter, it is an essential requirement that the synchronizer circuitry be able to tolerate significant amounts of phase difference (or, skew) between the clocks caused thereby.

Several synchronizer designs are currently available that attempt to synchronize data transfer operations across a clock boundary. A significant drawback of these solutions, however, is that their performance with respect to clock skew is not entirely satisfactory, especially where faster clock signals are employed.

SUMMARY OF THE INVENTION

Accordingly, the present invention advantageously provides a high skew-tolerant synchronizer system and method for transferring data across a clock domain boundary in a digital electrical system such as, e.g., a computer system. Specifically, the system and method of the present invention is operable to transfer data from circuitry disposed in a higher frequency clock domain actuated by a first clock signal (e.g., a core clock signal) to circuitry disposed in a lower frequency clock domain actuated by a second clock signal (e.g., a bus clock signal).

In a presently preferred exemplary embodiment of the present invention, the first and second clock signals are provided in a predetermined frequency ratio, e.g., [N:M]; N equals the number of cycles of the first clock signal and M equals the number of cycles of the second clock signal and further equals (N−1), wherein the cycles of the first and second clock signals are numbered between two consecutive substantially coincident rising edges of the first and second clock signals, which coincident rising edges define a coincident edge (CE) interval for purposes of the present invention.

A first latch gated by a first modified clock signal that is derived from the first clock signal and plurality of intermediary signals relating thereto is operable to generate a first latched data output based on the data provided by the circuitry in the higher frequency clock domain, which data is disposed such that the data values in the (N−1)th and Nth cycles are the same. The first latched data output is provided to a second latch disposed in the lower frequency clock domain. The second latch gated by a second modified clock signal that is synthesized using the second clock signal and at least one intermediary clock signal derived therefrom is operable to generate a second latched output. A register is operable to synchronize the second latched data output into a synchronized data output for subsequent use by the circuitry disposed in the lower clock frequency domain.

Preferably, a first logic circuit disposed in the higher frequency clock domain is operable with three intermediary clock signals, CHOP_CORE1 through CHOP_CORE3, in addition to the first clock signal for generating the first modified clock (MOD_CORE) signal, wherein each intermediary clock signal is derived in a particular relationship with the first clock signal. Further, a second logic circuit disposed in the lower frequency clock domain is operable with at least one intermediary clock signal, CHOP_BUS, and the second clock signal for generating the second modified clock (MOD_BUS) signal.

In the presently preferred exemplary embodiment of the present invention, the CHOP_CORE1 signal derived from the first clock signal is generated such that its rising edge is triggered by a logic circuit with a propagation delay of about 800 picoseconds from an (N−2)th rising edge of the first clock signal in a particular CE interval and its falling edge is triggered by the same logic circuit (i.e., with a propagation delay of about 800 picoseconds) from an (N−2)th falling edge of the first clock signal in the particular CE interval. The CHOP_CORE2 signal derived from the first clock signal is generated such that its rising edge is triggered by a logic circuit with a propagation delay of about 400 picoseconds from an (N−1)th rising edge of the first clock signal in the select CE interval and its falling edge is triggered by the same logic circuit (i.e., with a propagation delay of about 400 picoseconds) from an Nth rising edge of the first clock signal in the CE interval.

In similar fashion, the CHOP_CORE3 signal derived from the first clock signal is generated such that its falling edge is triggered by a logic circuit with a propagation delay of about 400 picoseconds from an Nth rising edge of the first clock signal in the particular CE interval and its rising edge is triggered by the same logic circuit (with a propagation delay of about 400 picoseconds) from an Nth falling edge of the first clock signal in the CE interval. The CHOP_BUS signal derived from the second clock signal is generated such that its falling edge is triggered by a logic circuit with a propagation delay of about 400 picoseconds from an (M−2)th falling edge of the second clock signal in the particular CE interval and its rising edge is triggered by the logic circuit (with a propagation delay of about 400 picoseconds) from an (M−1)th falling edge of the second clock signal in the CE interval.

In one presently preferred exemplary embodiment of the present invention, the first logic circuit disposed in the higher frequency clock domain for generating the MOD_CORE signal is preferably comprised of an OR gate for ORing the CHOP_CORE1, CHOP_CORE2, and first clock signals and an AND gate operable to accept the CHOP_CORE3 signal for ANDing with the OR gate's output. The exemplary second logic circuit disposed in the lower frequency clock domain for generating the MOD_BUS signal is preferably comprised of an AND gate for ANDing the CHOP_BUS signal with the second clock signal.

In the exemplary embodiment where the first and second clock signals are provided at [1:1] ratio (i.e., same frequency), the intermediary clock signals are not provided with the rising and/or falling edges as set forth above. Instead, they are set to the following conditions: CHOP_CORE1= CHOP_CORE2=0; and CHOP_CORE3=1, with the modified bus signal (CHOP_BUS) being 1.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
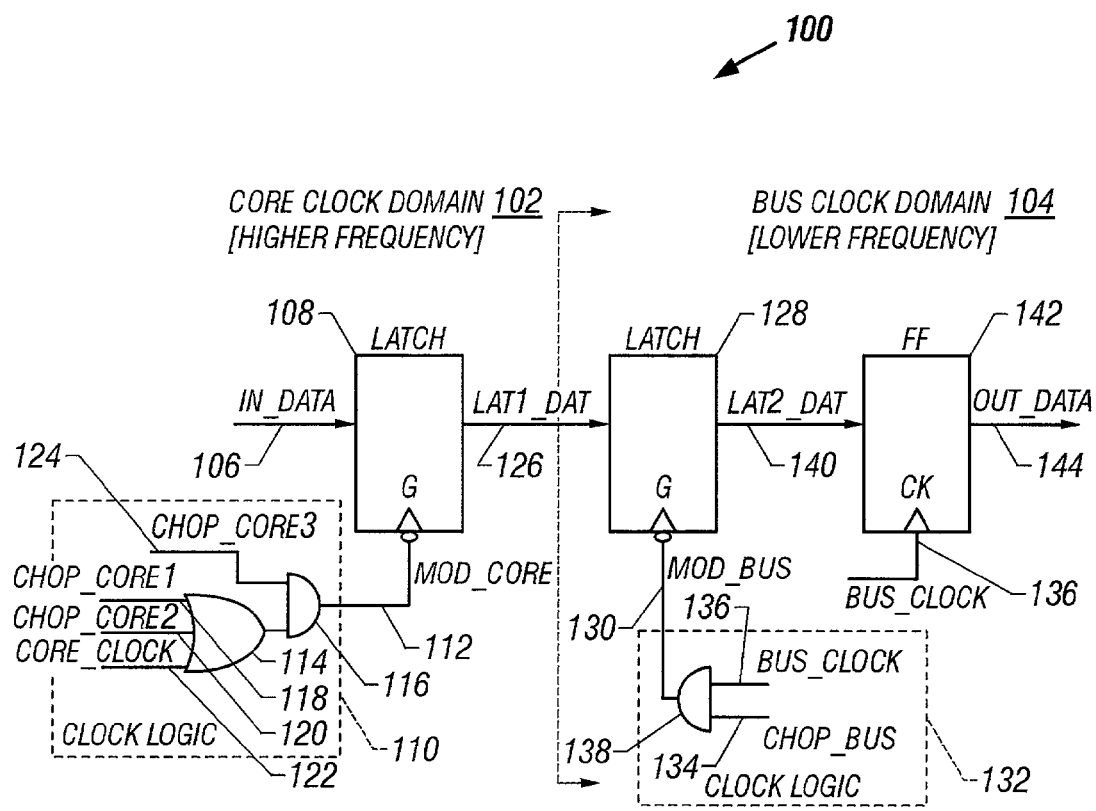
FIG. 1 depicts a logic block diagram of a presently preferred exemplary embodiment of a system for synchronizing data transfer operations from circuitry disposed in a higher frequency clock domain to circuitry disposed in a lower frequency clock domain in accordance with the teachings of the present invention.

In the drawings, like or similar elements are designated with identical reference numerals throughout the several views thereof, and the various elements depicted are not necessarily drawn to scale. Referring now to FIG. 1, depicted therein is a logic block diagram of a presently preferred exemplary embodiment of a system 100 for synchronizing data transfer operations from circuitry disposed in a higher frequency clock domain (i.e., first clock domain) to circuitry disposed in a lower frequency clock domain (i.e., second clock domain) in accordance with the teachings of the present invention. Reference numeral 102 refers to an exemplary higher frequency clock domain such as a core clock domain in a computer system. Further, a first clock signal operating at a higher frequency is provided for actuating the higher frequency clock domain 102. Preferably, a core clock signal (CORE_CLOCK) 122 is exemplary with respect to such a higher frequency clock signal.

In similar fashion, reference numeral 104 refers to an exemplary lower frequency clock domain such as a bus clock domain in a computer system. A second clock signal operating at a lower frequency is provided for actuating the lower frequency clock domain 104. Preferably, a bus clock signal (BUS_CLOCK) 136 exemplifies the lower frequency clock signal in the particular embodiment depicted in FIG. 1.

Those skilled in the art should readily appreciate that the first and second clock signals may be produced by way of any known or hitherto unknown mechanisms such as, e.g., phase-locked loops (PLLs), and the like. For purposes of the present invention, frequencies of the first and second clock signals are related to each other in a predetermined manner, preferably, e.g., in the ratio of [N:M], where N equals the number of cycles of the higher frequency clock (i.e., the first clock signal) and M equals the number of cycles of the lower frequency clock (i.e., the second clock signal) within an interval defined by two consecutive substantially coincident rising edges of the two clock signals. In the context of the present invention, this interval between two coincident rising edges of the clock signals is referred to as the CE interval. It is further preferred that M=(N−1), that is, for N cycles of the first clock signal in a particular CE interval, there are (N−1) cycles of the second clock signal.

Because the circuitry generating data in the higher frequency clock domain 102 is actuated by the first clock signal, there are N data pulses to be transmitted to the circuitry disposed in the lower frequency clock domain 104 operating at (N−1) cycles per CE interval. Accordingly, there is an extra cycle during which the circuitry in the higher frequency clock domain will transmit the same valid data as transmitted in the previous cycle. It will be realized by those skilled in the art upon having reference hereto that the (N−1)th data and Nth data to be transmitted are therefore exactly the same in the presently preferred exemplary embodiment of the present invention. As will be explained in greater detail hereinbelow, the present invention's circuitry is operable to modify the first and second clock signals for appropriately clocking only (N−1) data pulses in order to effectuate data transfer across the clock domain boundary even where a significant skew exists between the first and second clocks.

Continuing to refer to FIG. 1, reference numeral 106 refers to the outgoing data to be transmitted from the circuitry in clock domain 102 to the circuitry in clock domain 104. A first latch 108 disposed in clock domain 102 is operable to receive the data as IN_DATA signal, which latch is gated by a first modified clock signal (i.e., MOD_CORE) 112 that will be described in additional detail below. As is well known, the latch 108 is operable to latch IN_DATA 106 and generate a first latched data output (LAT1_DAT) 126. A second latch 128 disposed in clock domain 104 is provided with LAT1_DAT 126, which latch is gated by a second modified clock signal (MOD_BUS) 130 that will also be described in additional detail below. The second latch 128 is operable to latch the first latched data received from the higher frequency clock domain 102 in order to generate a second latched data output (LAT2_DAT) 140.

A register 142 is operable to receive the second latched data output 140 from the second latch 128, which register is clocked responsive to the second clock signal (i.e., BUS_CLOCK signal) 136. In a presently preferred exemplary embodiment of the present invention, the register 142 is embodied as a flip-flop (FF) and operates to generate a synchronized data output (OUT_DATA) 144 on the rising edge of the second clock signal. Thereafter, OUT_DATA 144 may be supplied to the circuitry disposed in the lower frequency clock domain for subsequent use.

An exemplary first clock logic circuit 110 disposed in clock domain 102 is operable to synthesize the MOD_CORE signal 112 based on a plurality of intermediary clock signals which are generated in a particular relationship with respect to the first clock signal 122. In the presently preferred exemplary embodiment of the present invention, three intermediary clock signals, CHOP_CORE1 118, CHOP_CORE2 120 and CHOP_CORE3 124, are used in addition to the CORE_CLOCK signal 122 for generating the MOD_CORE signal 112. The exemplary logic circuit 110 is comprised of an OR gate 114 for ORing the CHOP_CORE1 signal 118, CHOP_CORE2 signal 120, and the first clock signal, i.e., CORE_CLOCK 122. An AND gate 116 is provided for ANDing the output provided by the OR gate 114 with the remaining CHOP_CORE signal, i.e., CHOP_CORE3 124.

Still continuing to refer to FIG. 1, an exemplary second clock logic circuit 132 disposed in clock domain 104 is operable to synthesize the second modified clock signal (i.e., MOD_BUS) 130 using the second clock signal 136 and at least one intermediary clock signal that is derived therefrom. In the presently preferred exemplary embodiment of the present invention, an intermediary clock signal called CHOP_BUS 134 and BUS_CLOCK 136 are utilized for generating the MOD_BUS signal 130 that is gated to the second latch 128 in clock domain 104. The exemplary logic circuit 132 is comprised of an AND gate operable to AND the CHOP_BUS 134 and BUS_CLOCK 136.

Figure 2:
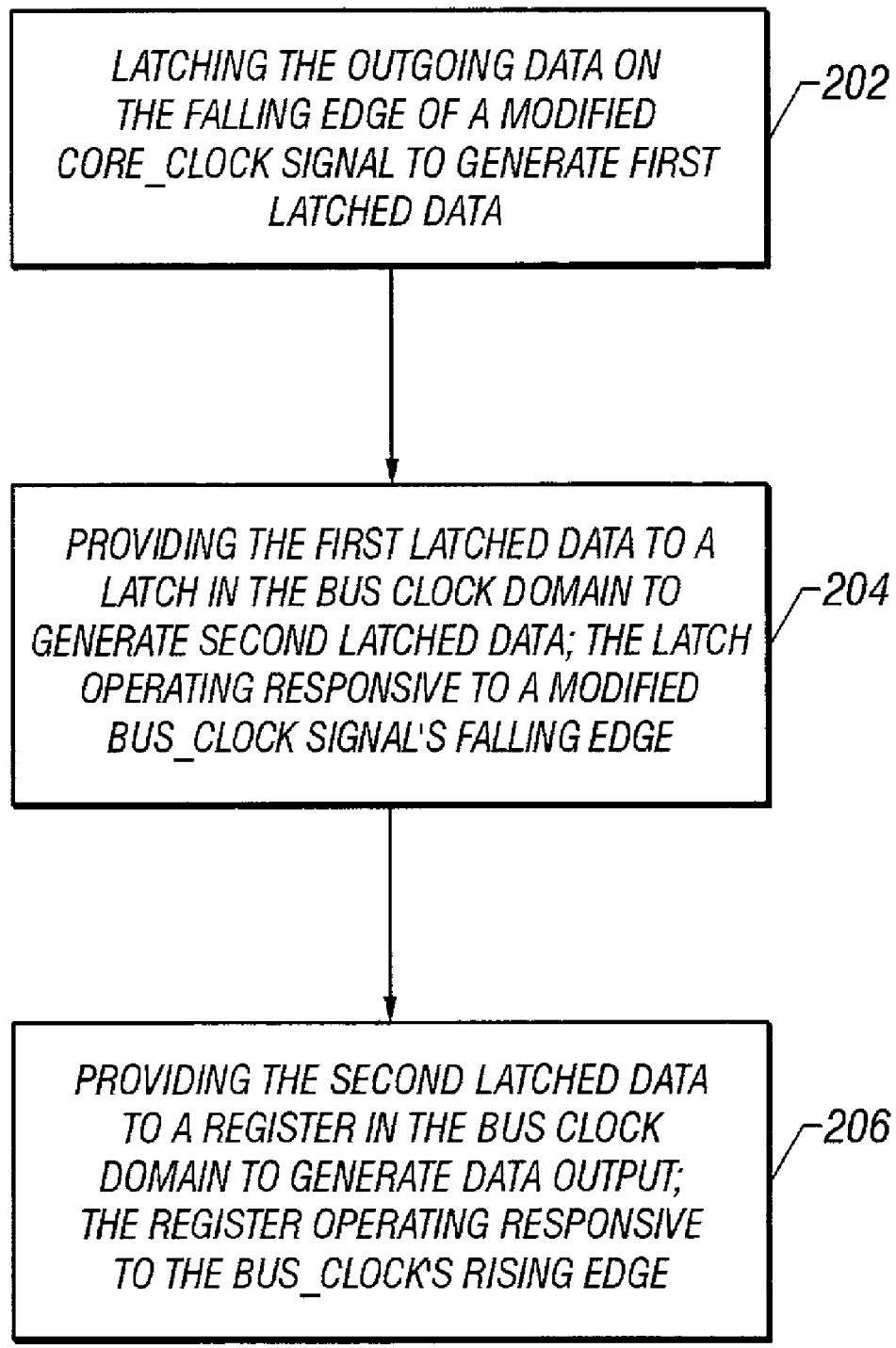
FIG. 2 depicts a flow chart of the various steps involved in a presently preferred exemplary method of transferring data across a clock domain boundary.

FIG. 2 depicts a flow chart of the various steps involved in a presently preferred exemplary method of transferring data across a clock domain boundary from the higher frequency clock domain 102 to the lower frequency clock domain 104 in accordance with the teachings of the present invention. The outgoing data provided by the circuitry disposed in the higher frequency clock domain 102 is first latched on the falling edge of a first modified clock signal (e.g., MOD_CORE signal) to generate a first latched data output (step 202). The first latched data output is thereafter provided to a second latch disposed in the lower frequency clock domain 104 which latches the first latched data output on the falling edge of a second modified clock signal (e.g., MOD_BUS signal) in order to generate a second latched data output (step 204). The second latched data is provided to a register in the lower frequency clock domain 104 which registers it on the rising edge of the second clock signal (step 206) to produce a synchronized data output for subsequent use.

In accordance with the teachings of the present invention, the intermediary clock signals used by the logic circuits 110 and 132 for generating the first and second modified clock signals, respectively, may be generated using any combinational or sequential logic so long as certain time constraints are met as set forth in the following. In the presently preferred exemplary embodiment of the present invention, the CHOP_CORE1 signal derived from the first clock signal is generated such that its rising edge is triggered with a propagation delay of about 800 picoseconds from an (N−2)th rising edge of the first clock signal in a particular CE interval and its falling edge is triggered with a propagation delay of about 800 picoseconds from an (N−2)th falling edge of the first clock signal in the particular CE interval. The CHOP_CORE2 signal derived from the first clock signal is generated such that its rising edge is triggered with a propagation delay of about 400 picoseconds from an (N−1)th rising edge of the first clock signal in the select CE interval and its falling edge is triggered with a propagation delay of about 400 picoseconds from an Nth rising edge of the first clock signal in the particular CE interval.

In similar fashion, the CHOP_CORE3 signal derived from the first clock signal is generated such that its falling edge is triggered with a propagation delay of about 400 picoseconds from an Nth rising edge of the first clock signal in a particular CE interval and its rising edge is triggered with a propagation delay of about 400 picoseconds from an Nth falling edge of the first clock signal in the particular CE interval. The CHOP_BUS signal derived from the second clock signal is generated such that its falling edge is triggered with a propagation delay of about 400 picoseconds from an (M−2)th falling edge of the second clock signal in a particular CE interval and its rising edge is triggered with a propagation delay of about 400 picoseconds from an (M−1)the falling edge of the second clock signal in the particular CE interval.

It should be recognized that the logic circuits for generating the various CHOP_CORE or CHOP_BUS signals can be implemented in any fashion as long as the timing constraints set forth above are substantially met. Further, where the logic circuits are comprised of one or more logic gates, the timing constraints may also be formulated in terms of gate propagation delays. Exemplary implementations can include, for instance, a propagation delay of about 200 picoseconds per gate, 400 picoseconds per gate, etc.

Figure 3:
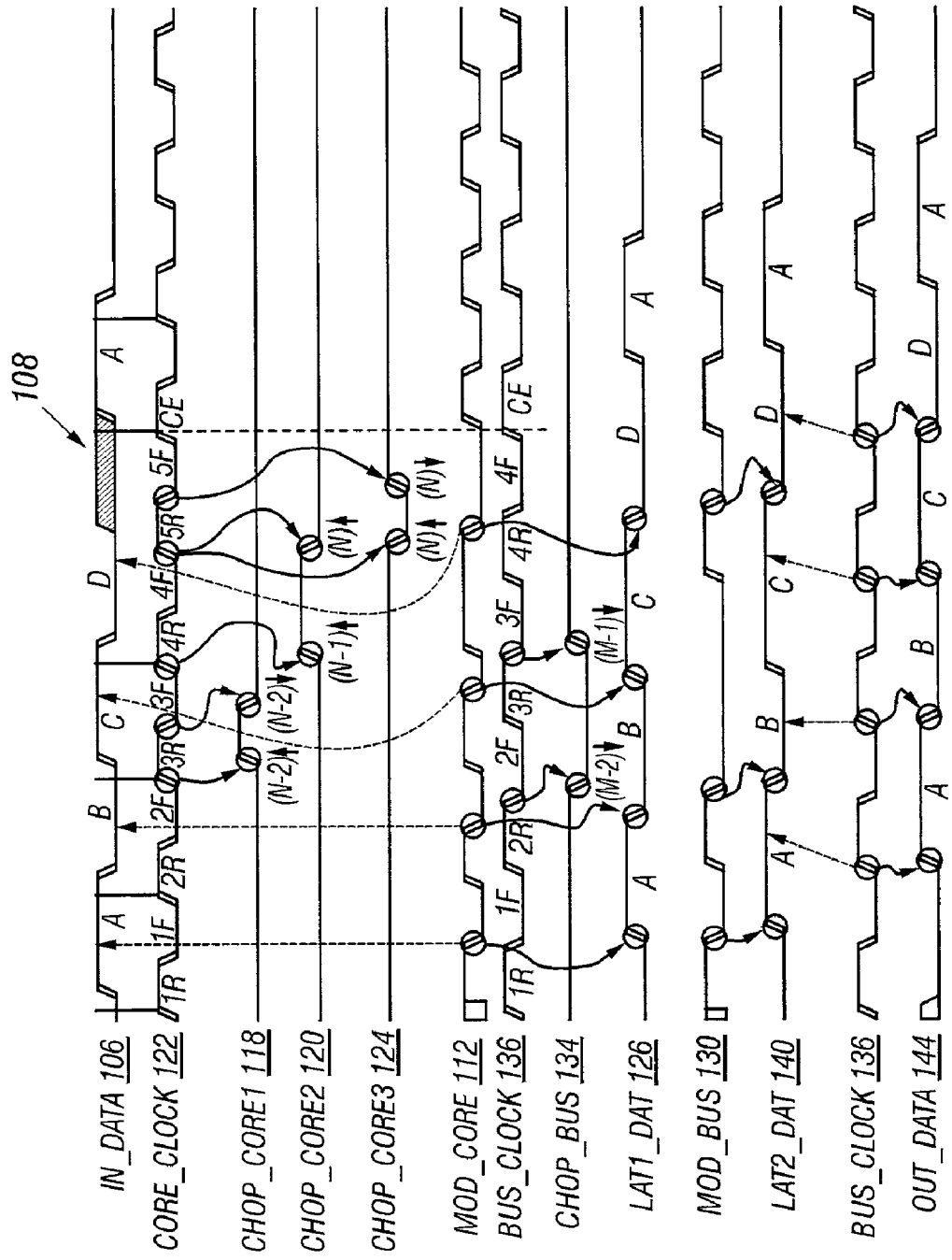
FIG. 3 depicts a timing diagram of the various signals used for effectuating the high skew-tolerant data transfer method of the present invention for an exemplary [5:4] clock frequency ratio.

Referring now to FIG. 3, depicted therein is a timing diagram of the various signals used for effectuating the high skew-tolerant data transfer method of the present invention for an exemplary [5:4] clock frequency ratio where for every 4 BUS_CLOCK cycles, there exist 5 CORE_CLOCK cycles within a CE interval. The data to be transferred from the CORE_CLOCK domain is represented by IN_DATA 106 where A, B, C, D and D denote logic states for 5 data bits in a particular CE interval such that the logic state of the fourth data bit is maintained for an extra CORE_CLOCK cycle, as identified by the hatched portion 108 of IN_DATA 106.

The first latched data (LAT1_DATA) 126 is generated on the falling edge of the MOD_CORE signal 112 which is synthesized by the first logic circuit disposed in the CORE_CLOCK domain. Input signals thereto are generated as follows. The rising edge of the CHOP_CORE1 signal 118 is triggered by the third rising edge (↑) of the CORE_CLOCK signal 122 with a delay of about 800 picoseconds in a particular CE interval. Its falling edge is triggered with a delay of about 800 picoseconds from the third falling edge (↑) of the CORE_CLOCK signal 122 in the selected CE interval. The CHOP_CORE2 signal 122 is generated with a rising edge that is triggered with a delay of about 400 picoseconds by the fourth rising edge (↑) of the CORE_CLOCK 122 in the CE interval. Subsequently, the CHOP_CORE2 signal is held high until its falling edge is generated based on the fifth rising edge (↑) of the CORE_CLOCK signal 122, also with a delay of about 400 picoseconds.

The CHOP_CORE3 signal 124 starts out in a logic HIGH condition and its falling edge is triggered based on the fifth rising edge (↑) of the CORE_CLOCK 132. Preferably, a propagation delay of about 400 picoseconds is provided for creating the falling edge in the CHOP_CORE3 signal 124. Thereafter, it is brought back up to the logic HIGH condition by creating a rising edge based on the fifth falling edge (↓) of the CORE_CLOCK 122. Again, a propagation delay of about 400 picoseconds (i.e., a single gate delay) is provided.

The second latched data (LAT2_DAT) 140 is generated based on the gating MOD_BUS 130 signal, which is synthesized by the second logic circuit in the lower frequency clock domain. The input GENERATING signal 134 is created as follows. The CHOP_BUS signal 134 also starts out in a logic HIGH condition and is driven LOW by creating a falling edge based on the second falling edge (↓) of the BUS_CLOCK 136. Thereafter, it is driven HIGH by creating a rising edge that is triggered with respect to the third falling edge (↓) of the BUS_CLOCK 136. A propagation delay of about 400 picoseconds is provided in the formation of the rising and falling edges of the CHOP_BUS signal 134.

The exemplary logic circuit 128 (shown in FIG. 1) is operable to synthesize the MOD_BUS signal 130 based on the combination of the intermediary clock signal and the BUS_CLOCK as described hereinabove. It can be seen in the timing diagram that the pulse width of the MOD_BUS signal 130 is modulated to a variable degree such that the falling edges therein, which gate the data into the second latch in the lower frequency clock domain, are timed to latch the LAT1_DAT 126 at appropriate times to generate the LAT2_DAT 140. The rising edges of the BUS_CLOCK 136 actuate the register disposed in the lower frequency clock domain, which register is then operable to register the LAT2_DAT 140 at appropriate logic states to generate the OUT_DATA 144.

Figure 4:
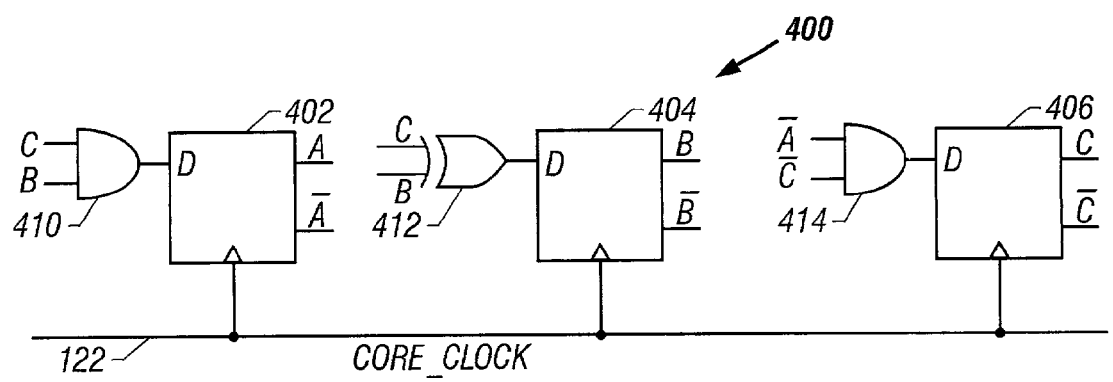
FIG. 4 depicts an exemplary counter circuit for counting the rising edges of a core clock signal employed in the [5:4] clock frequency scenario.

FIG. 4 depicts an exemplary counter circuit 400 for counting the rising edges of the CORE_CLOCK signal 122 employed in the [5:4] clock frequency scenario illustrated hereinabove. Three D flip-flops 402, 404 and 406 are clocked by the rising edges of CORE_CLOCK 122, wherein the D input of each flip-flop is operable to receive an output synthesized by a combination of signals that are generated by one or more of the remaining flip-flops. In the exemplary counter circuit 400, an AND gate 410 receives signals B and C, whose output is provided to the D input of D flip-flop 402. As shown in FIG. 4, signals B and C are generated by the flip-flops 404 and 406. An exclusive-OR (XOR) gate 412 also receives B and C signals, whose output is provided to the D input of the flip-flop 404. An AND gate 414 receives A BAR and C BAR signals, whose logic output is provided to the D input of the flip-flop 406.

Figure 5:
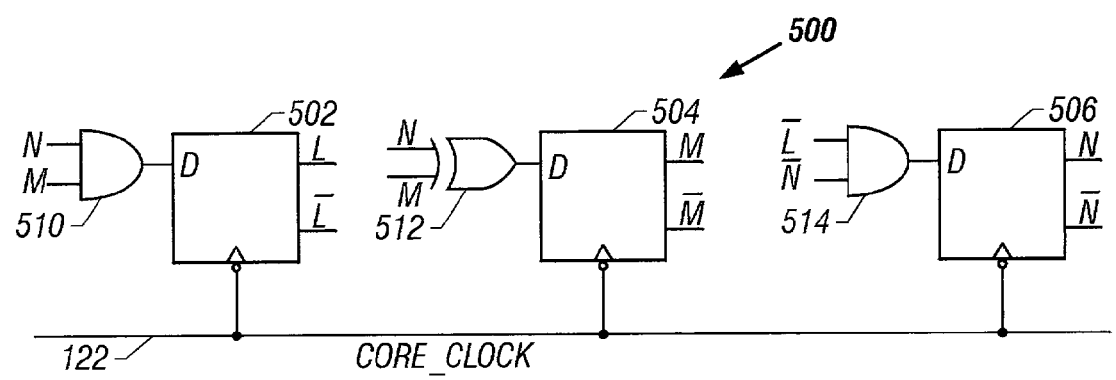
FIG. 5 depicts an exemplary counter circuit for counting the falling edges of the core clock signal employed in the [5:4] clock frequency scenario.

FIG. 5 depicts an exemplary counter circuit 500 for counting the falling edges of the CORE_CLOCK signal 122 employed in the [5:4] clock frequency scenario. It should be appreciated that the counter circuit 500 is essentially identical to the counter circuit 400 described above, except that the three D flip-flops 502, 504 and 506 are clocked by the falling edges of CORE_CLOCK 122. Reference numerals 510, 512 and 514 refer to the AND, XOR and AND gates that provide inputs to the three flip-flops, respectively, in a manner similar to the operation of the counter circuit 400.

Figure 6:
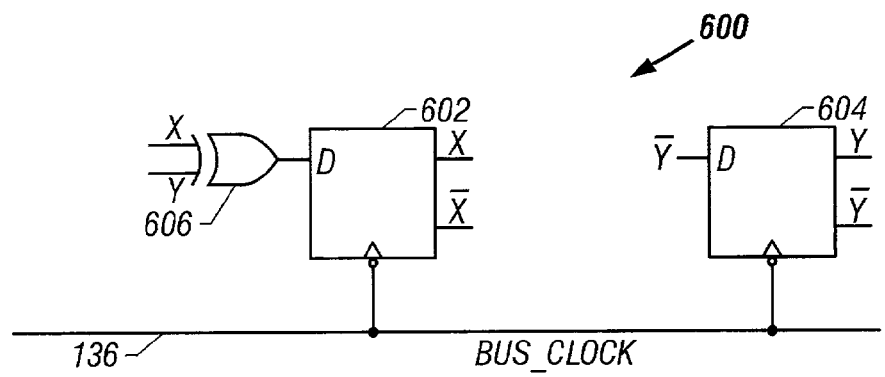
FIG. 6 depicts an exemplary counter circuit for counting the falling edges of a bus clock signal employed in the [5:4] clock frequency scenario.

FIG. 6 depicts an exemplary counter circuit 600 for counting the falling edges of the BUS_CLOCK signal 136 employed in the [5:4] clock frequency scenario. Two D flip-flops 602 and 604 are clocked by the falling edges of BUS_CLOCK 110. In the exemplary embodiment of the counter circuit 600, the outputs of the flip-flops are fed back as at least part of the inputs to the flip-flops. Whereas the output of an XOR gate 606 is provided to the D input of the flip-flop 602, no logic gates are employed with respect to the D input of the flip-flop 604.

Figure 7A:
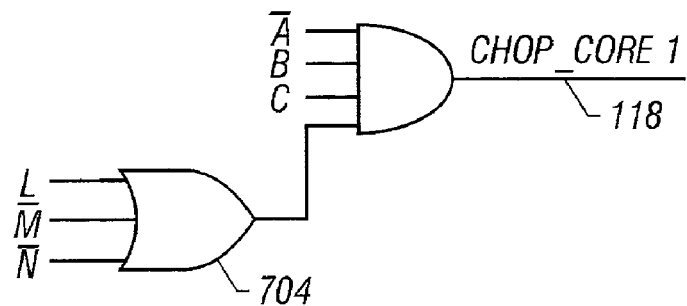
FIGS. 7A–7D depict exemplary logic circuits for generating a plurality of intermediary clock signals used in the practice of the present invention.
Figure 7B:
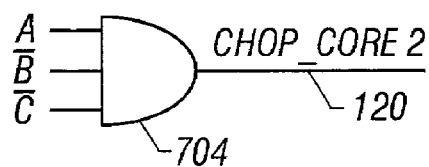
Figure 7C:
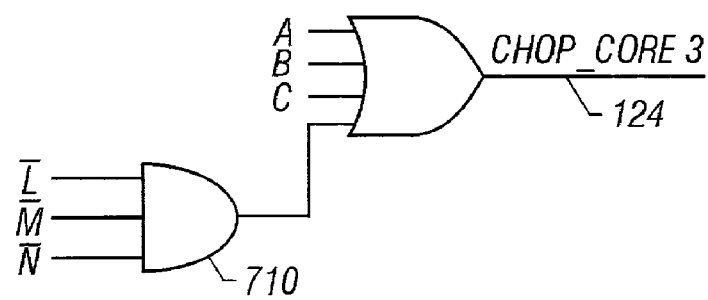
Figure 7D:
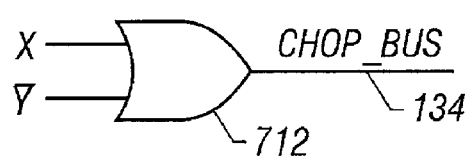

FIGS. 7A–7D depict four exemplary logic circuits for generating the various intermediary clock signals (i.e., three CHOP_CORE signals and one CHOP_BUS signal) described above. Each of the logic circuits is preferably operable to receive a combination of one or more signals generated by the counter circuits set forth in the foregoing Detailed Description with respect to FIGS. 4–6, either individually or through a combination of at least one logic gate. As shown in FIG. 7A, an AND gate 702 receiving signals A BAR, B and C, in addition to the output from an OR gate 704, is operable to generate CHOP_CORE1 118. A single AND gate 706 receiving signals A, B BAR and C BAR is used in the exemplary logic circuit for generating CHOP_CORE2 120. Referring to FIG. 7C, an OR gate 708 receiving signals A, B and C, in addition to the output from an AND gate 710, is operable to generate CHOP_CORE3 124. In FIG. 7D, a single OR gate 712 is used in the exemplary logic circuit for generating the CHOP_BUS signal 134 based on X and Y BAR inputs provided by the counter circuit 600.

Based upon the foregoing Detailed Description, it should be readily apparent that the present invention provides a simple yet highly effective data transfer synchronizer system and method that allows two interfaces operating at different clock frequencies to send information from the higher frequency domain circuitry to the lower frequency domain circuitry at high speeds with low latency, even where the skew between the clocks is substantial. Because the combinational logic necessary for creating the first and second modified clock signals or the intermediary clock signals is relatively simple and avoids the use of more complicated circuitry, e.g., cross-coupled gates to generate modified core or modified bus clock signals, et cetera, which gives rise to unstable behavior, a robust data transfer synchronizer solution is advantageously realized.

Further, it is believed that the operation and construction of the present invention will be apparent from the foregoing Detailed Description. While the system and method shown and described have been characterized as being preferred, it should be readily understood that various changes and modifications could be made therein (e.g., in the implementation of the logic circuitry and generation of the modified or intermediary clock signals) without departing from the scope of the present invention as set forth in the following claims.

What is claimed is:

1. A method of transferring data from circuitry disposed in a higher frequency clock domain to circuitry disposed in a lower frequency clock domain, said higher frequency clock domain operating with a first clock signal and said lower frequency clock domain operating with a second clock signal, comprising:
   latching said data in a first latch to generate a first latched data output, said first latch operating in response to a first modified clock signal that is synthesized based on a plurality of intermediary clock signals that are generated at least in part from said first clock signal;
   providing said first latched data output to a second latch disposed in said lower frequency clock domain, wherein said second latch is gated by a second modified clock signal synthesized at least in part from said second clock signal, said second latch operating to generate a second latched data output; and
   providing said second latched data output to a register clocked by said second clock signal for generating a synchronized data output operable to be supplied to said circuitry disposed in said lower frequency clock domain.

2. The method of transferring data as set forth in claim 1, wherein said first and second clock signals are provided at a ratio of [N:M], where N equals the number of cycles of said first clock signal and M equals the number of cycles of said second clock signal and further equals (N−1), said cycles of said first and second clock signals being disposed between two substantially coincident rising edges of said first and second clocks signals that demarcate a coincident edge (CE) interval.

3. The method of transferring data as set forth in claim 2, wherein said plurality of intermediary clock signals are generated in a particular relationship to said first clock signal and said second modified clock signal is manufactured from at least one intermediary clock signal that is generated in a particular relationship to said second clock signal.

4. The method of transferring data as set forth in claim 3, wherein said plurality of intermediary clock signals that are generated in a particular relationship to said first clock signal comprise CHOP_CORE1, CHOP_CORE2 and CHOP_CORE3 signals and said at least one intermediary clock signal that is generated in a particular relationship to said second clock signal comprises a CHOP_BUS signal.

5. The method of transferring data as set forth in claim 3, wherein said CHOP_CORE1 signal is generated such that its rising edge is triggered based on an (N−2)th rising edge of said first clock signal in a particular CE interval and its falling edge is triggered based on an (N−2)th falling edge of said first clock signal in said particular CE interval.

6. The method of transferring data as set forth in claim 5, wherein said CHOP_CORE2 signal is generated such that its rising edge is triggered based on an (N−1)th rising edge of said first clock signal in said particular CE interval and its falling edge is triggered based on an Nth rising edge of said first clock signal in said particular CE interval.

7. The method of transferring data as set forth in claim 6, wherein said CHOP_CORE3 signal is generated such that its falling edge is triggered based on said Nth rising edge of said first clock signal in said particular CE interval and its rising edge is triggered based on an Nth falling edge of said first clock signal in said particular CE interval.

8. The method of transferring data as set forth in claim 7, wherein said CHOP_BUS signal is generated such that its falling edge is triggered based on an (M−2)th falling edge of said second clock signal in said particular CE interval and its rising edge is triggered based on an (M−1)th falling edge of said second clock signal in said particular CE interval.

9. The method of transferring data as set forth in claim 8, wherein said rising edge of said CHOP_CORE1 signal is delayed by a propagation delay of approximately about 800 picoseconds from said (N−2)th rising edge of said first clock signal in said particular CE interval.

10. The method of transferring data as set forth in claim 9, wherein said falling edge of said CHOP_CORE1 signal is delayed by a propagation delay of approximately about 800 picoseconds from said (N−2)th rising edge of said first clock signal in said particular CE interval.

11. The method of transferring data as set forth in claim 8, wherein said rising edge of said CHOP_CORE2 signal is delayed by a propagation delay of approximately about 400 picoseconds from said (N−1)th rising edge of said first clock signal in said particular CE interval.

12. The method of transferring data as set forth in claim 11, wherein said falling edge of said CHOP_CORE2 signal is delayed by a propagation delay of approximately about 400 picoseconds from said Nth rising edge of said first clock signal in said particular CE interval.

13. The method of transferring data as set forth in claim 8, wherein said falling edge of said CHOP_CORE3 signal is delayed by a propagation delay of approximately about 400 picoseconds from said Nth rising edge of said first clock signal in said particular CE interval.

14. The method of transferring data as set forth in claim 13, wherein said rising edge of said CHOP_CORE3 signal is delayed by a propagation delay of approximately about 400 picoseconds from said second Nth falling edge of said first clock signal in said particular CE interval.

15. The method of transferring data as set forth in claim 8, wherein said falling edge of said CHOP_BUS signal is delayed by a propagation delay of approximately about 400 picoseconds from said (M−2)th falling edge of said second clock signal in said particular CE interval.

16. The method of transferring data as set forth in claim 15, wherein said rising edge of said CHOP_BUS signal is delayed by a propagation delay of approximately about 400 picoseconds from said (M−1)th falling edge of said second clock signal in said particular CE interval.

17. The method of transferring data as set forth in claim 4, wherein said first modified clock signal is manufactured by a logic circuit disposed in said higher frequency clock domain, said logic circuit comprising an OR gate for ORing said CHOP_CORE1, CHOP_CORE2 and first clock signals and an AND gate operable to accept said CHOP_CORE3 signal for ANDing with an output generated by said OR gate.

18. The method of transferring data as set forth in claim 4, wherein said second modified clock signal is manufactured by a logic circuit disposed in said lower frequency clock domain, said logic circuit comprising an AND gate operable to accept said CHOP_BUS signal for ANDing with said second clock signal.

19. A method of transferring data across a clock domain boundary, comprising:
   latching data provided by circuitry disposed in a first frequency domain to generate a first latched data output, said latching being gated in conjunction with a first modified clock signal that is synthesized based on a first clock signal and three intermediary clock signals derived therefrom, wherein said first frequency domain is actuated by said first clock signal;

providing said first latched data output to a second latch disposed in a second frequency domain to generate a second latched output, said second latch being gated by a second modified clock signal that is synthesized based on a second clock signal and at least one intermediary clock signal derived therefrom, wherein said second frequency domain is actuated by said second clock signal;

providing said second latched data output to a register clocked by said second clock signal, said second register operating to generate a synchronized data output; and providing said synchronized data output to circuitry disposed in said second frequency domain actuated by said second clock signal, wherein said first clock signal operates at a higher frequency and said second clock signal operates at a lower frequency, said higher and lower frequencies being related in a ratio of [N:M], where N equals the number of cycles of said first clock signal and M equals the number of cycles of said second clock signal and further equals (N−1), said cycles of said first and second clock signals being disposed between two substantially coincident rising edges of said first and second clocks signals that demarcate a coincident edge (CE) interval.

20. The method of transferring data across a clock domain boundary as set forth in claim 19, wherein first frequency domain is a core clock domain in a computer system.

21. The method of transferring data across a clock domain boundary as set forth in claim 20, wherein second frequency domain is a bus clock domain in a computer system.

22. The method of transferring data across a clock domain boundary as set forth in claim 19, wherein a first intermediary clock signal derived from said first clock signal is generated such that its rising edge is triggered with a propagation delay of about 800 picoseconds from an (N−2)th rising edge of said first clock signal in a particular CE interval and its falling edge is triggered with a propagation delay of about 800 picoseconds from an (N−2)th falling edge of said first clock signal in said particular CE interval.

23. The method of transferring data across a clock domain boundary as set forth in claim 19, wherein a second intermediary clock signal derived from said first clock signal is generated such that its rising edge is triggered with a propagation delay of about 400 picoseconds from an (N−1)th rising edge of said first clock signal in a particular CE interval and its falling edge is triggered with a propagation delay of about 400 picoseconds from an Nth rising edge of said first clock signal in said particular CE interval.

24. The method of transferring data across a clock domain boundary as set forth in claim 19, wherein a third intermediary clock signal derived from said first clock signal is generated such that its falling edge is triggered with a propagation delay of about 400 picoseconds from an Nth rising edge of said first clock signal in a particular CE interval and its rising edge is triggered with a propagation delay of about 400 picoseconds from an Nth falling edge of said first clock signal in said particular CE interval.

25. The method of transferring data across a clock domain boundary as set forth in claim 19, wherein said at least one intermediary clock signal derived from said second clock signal is generated such that its falling edge is triggered with a propagation delay of about 400 picoseconds from an (M−2)th falling edge of said second clock signal in a particular CE interval and its rising edge is triggered with a propagation delay of about 400 picoseconds from an (M−1) the falling edge of said second clock signal in said particular CE interval.

26. A system for transferring data from circuitry disposed in a first clock domain to circuitry disposed in a second clock domain, said first clock domain operating with a first clock signal and said second clock domain operating with a second clock signal, comprising:

a first latch gated by a first modified clock signal that is synthesized at least in part from said first clock signal, said first latch operating to generate a first latched data output based on data from said circuitry disposed in said first clock domain;

a first logic circuit operable to generate said first modified clock signal based on said first clock signal and a plurality of intermediary clock signals derived from said first clock signal;

a second latch disposed in said second clock domain, wherein said second latch is gated by a second modified clock signal synthesized at least in part from said second clock signal, said second latch operating to generate a second latched data output based on said first latched output received from said first latch;

a second logic circuit operable to generate said second modified clock signal based on said second clock signal and at least one intermediary clock signal derived from said second clock signal; and a register clocked by said second clock signal for generating a synchronized data output upon receiving said second latched data output, said register operating responsive to said second clock signal to provide said synchronized data output to said circuitry disposed in said second clock domain.

27. The system for transferring data as set forth in claim 26, wherein said first and second clock signals are provided at a ratio of [N:M], where N equals the number of cycles of said first clock signal and M equals the number of cycles of said second clock signal and further equals (N−1), said cycles of said first and second clock signals being disposed between two substantially coincident rising edges of said first and second clocks signals that demarcate a coincident edge (CE) interval.

28. The system for transferring data as set forth in claim 27, wherein said intermediary clock signals derived from said first clock signal comprise CHOP_CORE1, CHOP_CORE2 and CHOP_CORE3 signals, each of which signals is generated in a particular relationship with respect to said first clock signal.

29. The system for transferring data as set forth in claim 28, wherein said at least one intermediary clock signal derived from said second clock signal comprises a CHOP_BUS signal that is generated in a particular relationship with respect to said first clock signal.

30. The system for transferring data as set forth in claim 29, wherein said first logic circuit comprises an OR gate for ORing said CHOP_CORE1, CHOP_CORE2 and first clock signals and an AND gate operable to accept said CHOP_CORE3 signal for ANDing with an output generated by said OR gate.

31. The system for transferring data as set forth in claim 29, wherein said second logic circuit comprises an AND gate operable to accept said CHOP_BUS signal for ANDing with said second clock signal.

32. The system for transferring data as set forth in claim 29, wherein said CHOP_CORE1 signal derived from said first clock signal is generated such that its rising edge is triggered with a propagation delay of about 800 picoseconds from an (N−2)th rising edge of said first clock signal in a particular CE interval and its falling edge is triggered with a propagation delay of about 800 picoseconds from an (N−2)th falling edge of said first clock signal in said particular CE interval.

33. The system for transferring data as set forth in claim 29, wherein said CHOP_CORE2 signal derived from said first clock signal is generated such that its rising edge is triggered with a propagation delay of about 400 picoseconds from an (N−1)th rising edge of said first clock signal in a particular CE interval and its falling edge is triggered with a propagation delay of about 400 picoseconds from an Nth rising edge of said first clock signal in said particular CE interval.

34. The system for transferring data as set forth in claim 29, wherein said CHOP_CORE3 signal derived from said first clock signal is generated such that its falling edge is triggered with a propagation delay of about 400 picoseconds from an Nth rising edge of said first clock signal in a particular CE interval and its rising edge is triggered with a propagation delay of about 400 picoseconds from an Nth falling edge of said first clock signal in said particular CE interval.

35. The system for transferring data as set forth in claim 29, wherein said CHOP_BUS signal derived from said second clock signal is generated such that its falling edge is triggered with a propagation delay of about 400 picoseconds from an (M−2)th falling edge of said second clock signal in a particular CE interval and its rising edge is triggered with a propagation delay of about 400 picoseconds from an (M−1)the falling edge of said second clock signal in said particular CE interval.

36. The system for transferring data as set forth in claim 29, wherein said first and second clocks are provided at a ratio of [1:1], and further wherein said intermediary clock signals comprise CHOP_CORE1, CHOP_CORE2 and CHOP_CORE3 and signals such that CHOP_CORE1=CHOP_CORE2=0 and CHOP_CORE3=1, said CHOP_BUS being equal to 1.

* * * * *

UNITED STATES PATENT AND TRADEMARK OFFICE
CERTIFICATE OF CORRECTION

PATENT NO.        : 6,931,562 B1
APPLICATION NO. : 09/938206
DATED             : August 16, 2005
INVENTOR(S)       : Rajakrishnan Radjassamy It is certified that error appears in the above-identified patent and that said Letters Patent is hereby corrected as shown below:

In column 6, line 45, delete "(M-1)the" and insert -- (M-1)th --, therefor.

In column 12, lines 2-3, in Claim 25, delete "(M-1)the" and insert -- (M-1)th --, therefor.

In column 14, line 11, in Claim 35, delete "(M-1)the" and insert -- (M-1)th --, therefor.

Signed and Sealed this

Eleventh Day of August, 2009

David J. Kappos
*Director of the United States Patent and Trademark Office*